United States Patent [19]

Lauterbach

[11] 4,150,431

[45] Apr. 17, 1979

[54] FUEL CONSUMPTION RATE INDICATING SYSTEM FOR A VEHICLE

[75] Inventor: Jerre F. Lauterbach, Columbus, Ind.

[73] Assignee: Cummins Engine Company, Inc., Columbus, Ind.

[21] Appl. No.: 843,540

[22] Filed: Oct. 19, 1977

[51] Int. Cl.² .................. G01M 15/00; G01F 9/00; G01L 3/26

[52] U.S. Cl. .................. 364/442; 73/114; 123/139 AT; 235/61 J; 235/92 FL

[58] Field of Search .......... 364/442, 510, 431; 73/113, 114, 119 A; 235/61 J, 92 CP, 92 FL, 92 RT; 239/88, 89; 123/139 AT, 139 T

[56] References Cited

U.S. PATENT DOCUMENTS

| | | | |
|---|---|---|---|
| 2,749,897 | 6/1956 | Reiners | 123/139 AT |
| 3,159,152 | 12/1964 | Reiners | 123/139 AT |
| 3,351,288 | 11/1967 | Perr | 239/89 |
| 3,921,444 | 11/1975 | Taira et al. | 73/114 |
| 3,927,305 | 12/1975 | Gruhl | 364/442 |
| 3,967,097 | 6/1976 | Moretti | 364/442 |
| 3,972,224 | 8/1976 | Ingram | 364/442 |
| 3,983,372 | 9/1976 | Klaver | 73/114 |
| 3,987,671 | 10/1976 | Monaghan | 73/114 |
| 3,998,094 | 12/1976 | Martin | 73/114 |
| 4,012,949 | 3/1977 | Lanz | 73/114 |
| 4,020,683 | 5/1977 | Young | 73/114 |
| 4,061,023 | 12/1977 | Kuno et al. | 364/442 |

*Primary Examiner*—Malcolm A. Morrison
*Assistant Examiner*—Errol A. Krass
*Attorney, Agent, or Firm*—Merriam, Marshall & Bicknell

[57] ABSTRACT

This disclosure deals with a system for indicating to the driver of a vehicle a figure which represents the operating efficiency of the vehicle and which is derived from the fuel consumed and the distance traveled by the vehicle. The system measures the speed of the vehicle and a characteristic of the fuel supply system of the engine which is indicative of the fuel consumption. These two factors are combined in a dividing circuit which produces a signal that is fed to an indicator for displaying the figure to the operator of the vehicle. The vehicle engine has a fuel supply system including injectors and a fuel pressure regulating apparatus. The total fuel flowing to the injectors is divided into a burned flow portion and a return flow portion, and the burned flow portion is a relatively fixed ratio of the total flow. The characteristic of the supply system which is sensed is the total flow, and because of the fixed ratio, it is indicative of the fuel consumption rate.

1 Claim, 4 Drawing Figures

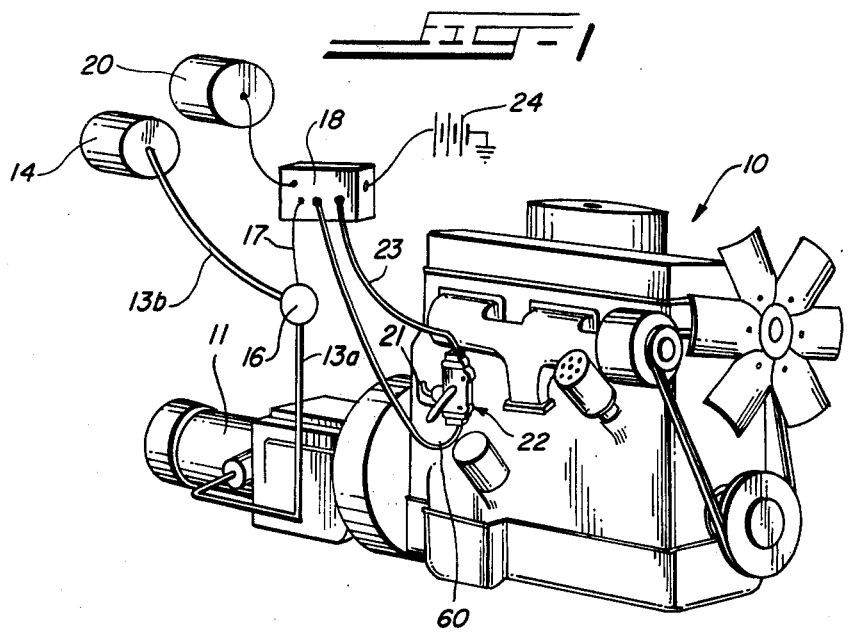
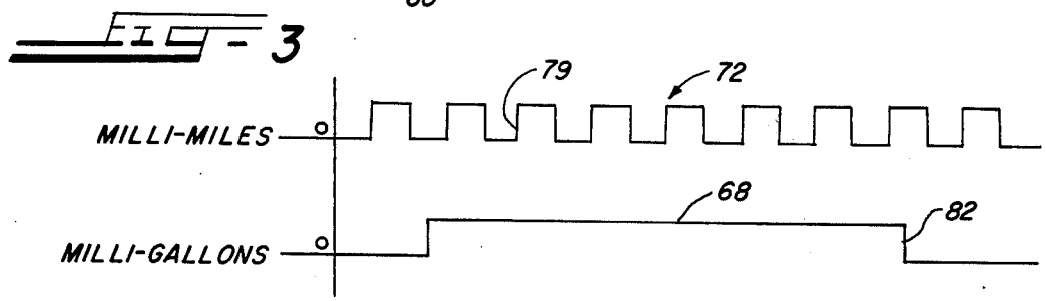
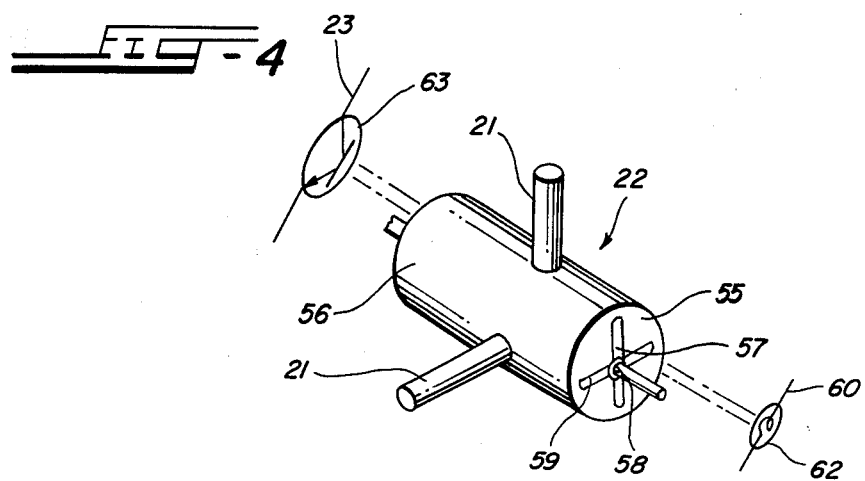

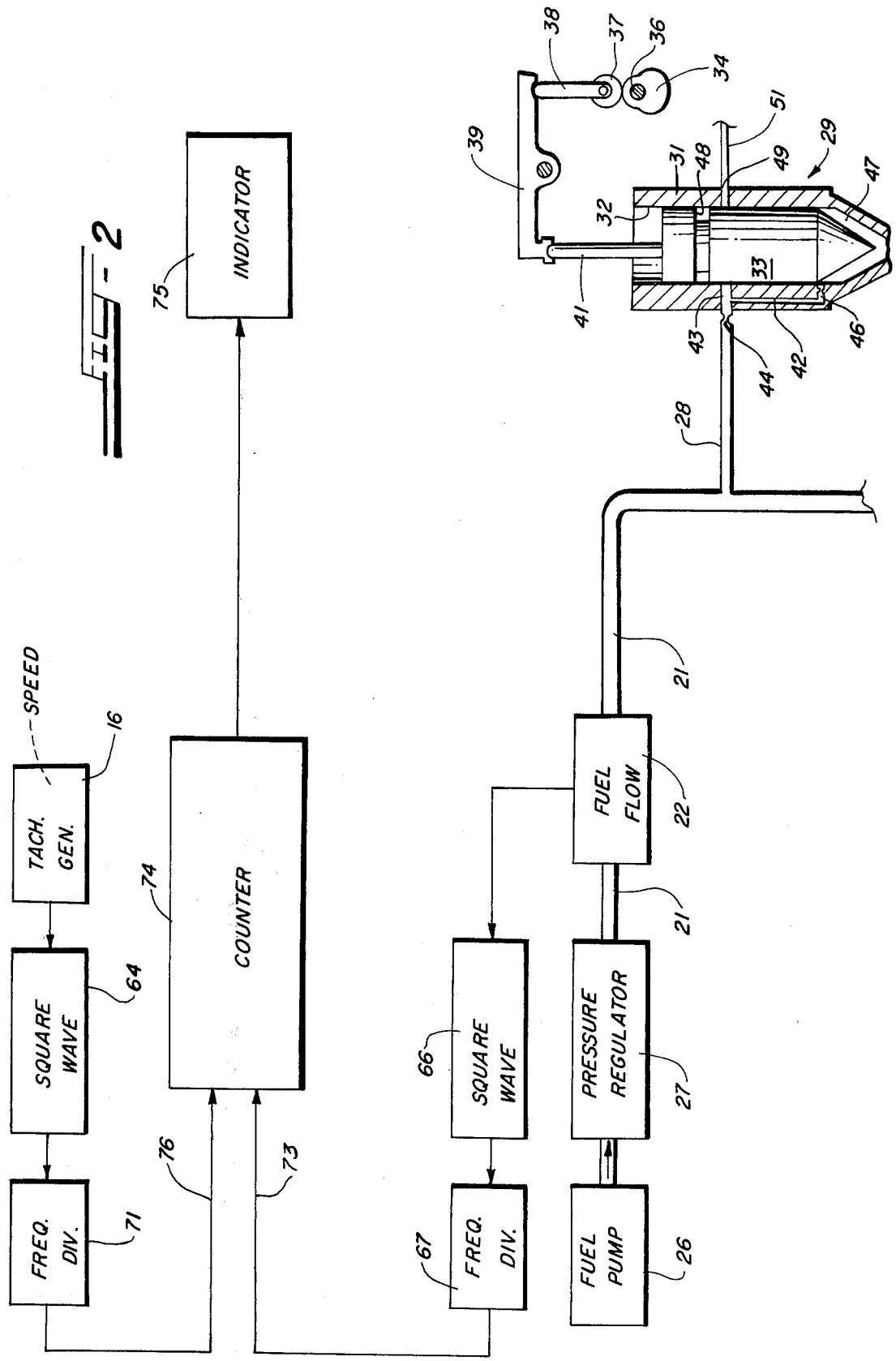

FUEL CONSUMPTION RATE INDICATING SYSTEM FOR A VEHICLE

U.S. Pat. application Ser. No. 717,775 now U.S. Pat. No. 4,062,230 discloses a system for measuring and displaying the fuel consumption rate of a vehicle powered by an internal combustion engine in order to indicate the operating efficiency. The system senses an engine operating parameter that is related to the quantity of fuel consumed by the engine, and the distance traveled by the vehicle, calculates a figure based on the quantity of fuel consumed and the distance traveled, and displays this figure to the driver of the vehicle.

The operating parameter that is sensed is the pressure of the fuel being supplied to injectors of the engine. Such an arrangement has been found to be difficult to implement however because a sensitive, durable and economical pressure sensor is not available. It has also been found to be difficult to make an accurate conversion from pressure to burned fuel flow.

It is a general object of this invention to provide an improvement on the above-described system.

It is a further object to provide an improved system which is capable of withstanding the temperatures and harsh operating conditions encountered in a vehicle such as a truck.

It is a further object to provide an improved system which is economical and accurate.

A system in accordance with the present invention is designed for use in a vehicle powered by an internal combustion engine, the engine including a fuel supply system wherein the rate of fuel consumption is controlled by adjusting the pressure in a fuel supply rail of the engine. The fuel supply system includes at least one injector which has a movable plunger, a burned fuel flow passage, a return fuel flow passage, and a fuel flow orifice through which the fuel entering the injector flows. The moving plunger acts as a valve and alternately directs the fuel flow through one passage and then the other. In such a system, the quantity of fuel flowing to the burned fuel flow passage bears a substantially fixed linear ratio to the total fuel flow. The system includes means for sensing speed and generating a speed signal representative of the speed of the vehicle, means for sensing total fuel flow and generating a flow signal representative of the burned fuel flow, means for combining the speed signal and the flow signal and producing a signal representing the fuel consumption rate of the vehicle, and indicator means responsive to the last mentioned signal for indicating the fuel consumption rate to the operator of the vehicle.

The foregoing and other objects and advantages of the present invention will become more apparent from the following detailed description taken in conjunction with the accompanying figures of the drawings, wherein:

FIG. 1 is a perspective view of an internal combustion engine for a vehicle, including a system in accordance with the invention;

FIG. 2 is a block diagram of the system;

FIG. 3 is a schedule of waveforms illustrating the operation of the system; and

FIG. 4 illustrates a fuel flow sensor of the system.

The specific embodiment of the invention described herein is designed to measure and indicate a unit of distance traveled per unit of fuel consumed. However, it should be recognized and kept in mind that the system could just as readily be designed to indicate a unit of fuel consumed per unit of distance traveled. Further, in both of the foregoing arrangements, the resulting figure could be indicated in either English units or in metric units. In the present specific example, the figure is in miles-per-gallon. The general term "fuel consumption rate", as used herein, is intended to apply to all of the foregoing arrangements and it forms an indication of the operating efficiency of the engine.

With reference to FIG. 1, the reference numeral 10 indicates an internal combustion engine for a vehicle, the engine having a fuel supply system wherein the quantity of the fuel consumed or burned by the engine is related to the fuel pressure in a fuel supply rail, and the fuel quantity is controlled by adjusting the fuel pressure. Fuel supply systems of this type are described, for example, in U.S. Pat. Nos. 2,727,503, 2,749,897 and 3,159,152. The engine 10 may be a compression ignition type including fuel injectors, as described in the foregoing patents. The power output from the engine is taken from a power output shaft of a transmission 11, and a speedometer cable made up of two sections 13a and 13b is connected between the output shaft and a speedometer and odometer 14 which indicates the speed of the vehicle and also the total distance traveled by the vehicle. The engine 10 may be, for example, connected to power a wheeled vehicle such as a highway truck. Connected in the cable, between the sections 13a and 13b, is a tachometer 16 that generates an output signal representative of the speed of the vehicle. The output signal of the tachometer is connected by a wire 17 to a unit 18 that includes the electronic circuitry of the system.

The engine fuel supply system includes a fuel supply rail, and a transducer 22 (FIGS. 1 and 4) is connected in the rail. Two sections 21 of the supply rail are shown in FIGS. 1 and 4. The transducer 22 generates a signal on a conductor 23 that is a function of the total fuel flow in the line 21. The electronic circuitry in the line 18 is connected to an indicator 20 and to a power supply such as a twelve volt battery 24 of the vehicle. The two indicators 14 and 20 may be mounted on the dashboard of the vehicle.

FIG. 2 is a more detailed illustration of the parts of the system. The engine fuel supply system includes a fuel supply pump 26, a fuel flow regulator 27 that responds to engine speed, and a supply rail 28 which carries the fuel to injectors 29 mounted to inject fuel in the combustion chambers of the engine. The sections 21 of the supply rail 28 are connected to the transducer 22.

Each of the injectors 29 includes a body 31 having a plunger bore 32 formed therein. A plunger 33 is reciprocably mounted in the bore 32, and it is moved in injection and retraction strokes by a cam 34 that is rotated by a cam shaft 36. A follower 37 rides on the cam 34 and a push tube 38 is connected between the follower 37 and one end of a rocker arm 39. The other end of the rocker arm 39 is connected by a link 41 to the plunger 33.

The cam 34 has large and small diameter sections, and it is rotated in timed relation with the other rotating parts of the engine. When the follower 37 is on the small diameter section of the cam 34, a retraction spring (not shown) moves the plunger 33 upwardly to the retracted position illustrated in FIG. 2. When the large diameter section of the cam 34 moves under the follower 37, the plunger is forced downwardly in the bore 32 and injects fuel into the combustion chamber.

The body 31 of the plunger 29 has a burned fuel flow passage 42 and a return fuel flow passage 43 formed therein. A balance orifice 44 is formed in the injector, and fuel from the supply rail 28 flows through the orifice 44 and then to the passages 42 or 43. When the plunger 33 is in the upward or retracted position as shown, the fuel flows from the balance orifice 44, through the burned fuel flow passage 42, through a metering orifice 46, and into a fuel chamber 47 below the plunger 33 in the body 31. When the plunger 33 is in the down position, the lower end of the plunger closes the orifice 46, and an annular groove 48 of the plunger 33 opens or establishes a connection between the return fuel flow passage 43 and a drain passage 49 that is connected to a return line 51. Thus, the plunger 33 acts as a valve and alternately directs the fuel entering the injector through the orifice 44, to either the burned fuel flow passage 42 or to the return fuel flow passage 43.

The injector 29 is illustrated only schematically in FIG. 2. U.S. Pat. No. 3,351,288 contains a complete and detailed description of the construction and operation of an injector of this character.

In the type of fuel system described in the foregoing mentioned patents, the pressure regulator 27 controls the fuel pressure in the rail 28 as a function of engine speed. The quantity of fuel flowing through the orifice 44 and to the burned fuel passage 42 is a function of the rail 28 fuel pressure and the length of time the plunger 33 is up and the orifice 46 is open. The flow split, or the relative quantities of fuel flowing in the passages 42 and 43, is a function of the profile of the cam 34, because it is the relative angular dimensions of the large and small diameter sections of the cam which determine the relative lengths of time, in each revolution of the cam shaft 36, fuel will flow through the passages 42 and 43. Thus, the ratio of the quantity of fuel flowing in the burned flow passage 42, to the total fuel flow through the rail 28 and the orifice 44, is substantially fixed and does not vary with engine speed and fuel pressure. There is a substantially linear relation between burned fuel flow and total fuel flow for a given cam profile. Further, the ratio varies little with changes in injectors and fuel pumps and regulators.

Given the foregoing relation, it will be apparent that the quantity of fuel flowing through the rail sections 21 and the fuel flow transducer 22 is a substantially linear function of the burned fuel flowing to the chamber 47 and the combustion chamber. Further, this linear function is maintained in an engine having a number of combustion chambers and associated injectors, as well as only one as shown.

An example of a fuel flow transducer for use in the system is illustrated in FIG. 4. The transducer 22 comprises a housing or barrel 56 that has openings coupled to the rail sections 21, and a cylindrical chamber 55 is formed in the barrel. A paddle wheel 57 is mounted coaxially within the chamber 55, and it is freely rotatable on its axis 58. The wheel 57 is rotatably mounted on end closures (not shown) for the two ends of the barrel 56. The wheel 57 includes a plurality of equally spaced paddles or vanes 59. In the present example, four vanes 59 extend radially from the axis 58 to closely adjacent the inner surface of the barrel 56. As the fuel flows from one of the sections 21 to the other through the chamber, the fuel rotates the wheel 57, and the rate of rotation at any instant has a direct relation to the rate of total fuel flow and burned fuel flow.

To sense the rate of rotation, a light source 62 is mounted at one end of the barrel 56 and a light sensitive element 63 is mounted at the other end. The source 62 may, for example, be a lamp or photo emissive diode, and the element 63 may be, for example, a photo sensitive diode. A conductor 60 (FIGS. 1 and 4) energizes the source 62. The elements 62 and 63 are preferably mounted outside the barrel 56 and windows are formed in the end closures. Light from the source 62 travels axially through the windows and the barrel 56, and the vanes 59 of the paddle 57 intersect and break the light path. Thus, during each revolution of the paddle 57, the sensor 63 will indicate four interruptions of the light beam, and four pulses (in the case where the paddle has four vanes) will appear on the conductor 23.

The signal out of the speed sensor 16 consists of an alternating signal having a frequency representative of vehicle speed, and the speed out of the transducer 22 consists of an alternating signal representative of the rate of fuel flow (both total flow and burned flow). With reference to FIG. 2, the fuel flow transducer signal is connected to a square wave circuit 66 which converts the flow signal to a train of square pulse, and to a frequency divider 67. The divider 67 is chosen or set to produce one square pulse 68 (FIG. 3) for each quantity unit of fuel flowing through the transducer 22. For example, each pulse 68 may represent 0.001 gallon, or one milligallon. The divisor of the circuit 67 is determined or set for a particular system design, taking into account factors such as the number of vanes 59, the size of the chamber 55, and the cam shape.

The speed signal is fed to a square wave circuit 69 and to another frequency divider 71 which produces a train of square pulses 72 (FIG. 3). The divider 71 is chosen or set to produce one pulse 72 for each unit of distance traveled by the vehicle. For example, each pulse 72 may represent 0.001 mile, or one millimile.

In the case of a truck powered by a diesel engine, the miles-per-gallon figure is in the neighborhood of seven at cruising speed, and consequently, there are around seven millimile (mm) pulses 72 for each milligallon (mg) pulse 68.

The mg pulses 68 are fed to an input 73 of a counter 74, and the mm pulses 72 are fed to a second input 76 of the gate 74. During the presence of each mg pulse 68, the counter 74 counts the mm pulses 72. The output of the counter 74 is connected to the indicator 20.

Thus the system operates to sense the vehicle speed and the fuel flow, and to provide an output which is linearly related to speed and to burned fuel. The counter 74, in effect, divides one signal by the other to produce a miles-per-gallon signal which is displayed to the vehicle operator. Readings are taken and the indicator 20 is updated at the end of each mpg measurement. The frequency at which this occurs may be chosen or set as desired, by the setting of the frequency divider 67, and the indicator is updated after each pulse 68.

As a specific example of a system in accordance with the invention, for a given cam 34 design, the divider 67 divides the sensor 22 frequency by approximately 286 to produce milligallon pulses. The tachometer 16 generates 8 pulses per revolution or 8000 pulses per mile. Setting the divider 71 to divide by 8000 produces 1000 pulses per mile or 1 pulse per millimile.

The system components are inexpensive and durable. The sensors are linearly related to the parameters they measure, and the digital form of the signals is conveniently and accurately handled.

The system may also be arranged to produce a signal representative of the quantity of fuel consumed per unit of distance traveled. In such an arrangement, the frequency dividers 67 and 71 would be arranged to produce a fuel flow representative signal having a frequency that is higher than the signal representing the distance traveled. The circuit 7 would be connected to count the number of fuel flow representative pulses occurring for each distance pulse, and the counter 74 would be reset after each distance pulse. An arrangement as described above is useful in Europe where a fuel consumption rate figure is normally given in terms of liters per kilometer.

Two examples of commercially available components which are suitable for use as the counter 74, are as follows:

(a) The Model 1952A Digital Counter-Timer, sold by the John Fluke Mfg, Co., Inc. of Seattle, Wash.; this Counter-Timer includes a Channel A input connector which may be connected to receive the mg pulses on the line 73, and a Channel B input connector which may be connected to receive the mm pulses on the line 76; the mode switch is set at the position designated "A GTD. BY B", and a visual display indicates the miles-per-gallon figure.

(b) The Model 1M-4100 Frequency Counter, sold by Heath Company of Benton Harbor, Michigan; this counter includes an "INPUT" connector on its front panel which may be connected to receive the mm pulses on the line 76, and an "INPUT/OUTPUT" connector on its back panel which may be connected to receive the mg pulses on the line 73; the switch designated "OSCILLATOR EXT INT" should be set in the "EXT" position, and the Counter includes a visual display which indicates the miles-per-gallon figure.

What is claimed is:

1. In an engine including a power output shaft for connection to drive a vehicle, the engine further including a fuel supply system comprised of at least one cam driven injector, a fuel supply line extending from a fuel supply to the injector, a fuel pump connected in said supply line and pumping supply fuel in said supply line to said injector, said injector operating as a valve and directing a portion of the supply fuel to a burned flow passage for combustion in the engine and directing the remainder of the supply fuel to a return passage, said return passage carrying said remainder of fuel to the fuel supply, the ratio of said portion of said supply fuel to said supply fuel being substantially constant over different engine operating conditions, the improvement comprising first sensing means connected in said supply line and providing a first signal representing the quantity of said supply fuel, second sensing means responsive to turning of said output shaft and providing a second signal representing movement of the vehicle, and circuit means receiving said first and said second signals, processing said signals, and indicating vehicle performance information to the operator of the vehicle related to fuel consumption and vehicle movement, said circuit means including means for dividing one of said first and second signals by the other and providing an indication of the fuel consumption rate.

* * * * *